United States Patent
Cheng

(10) Patent No.: US 8,364,084 B2
(45) Date of Patent: Jan. 29, 2013

(54) AUDIO BROADCASTING SYSTEM AND METHOD FOR BROADCASTING THE SAME

(75) Inventor: Ching-Wei Cheng, Keelung (TW)

(73) Assignee: Action Star Enterprise, Co. Ltd. (TW)

(*) Notice: Subject to any disclaimer, the term of this patent is extended or adjusted under 35 U.S.C. 154(b) by 602 days.

(21) Appl. No.: 12/609,046

(22) Filed: Oct. 30, 2009

(65) Prior Publication Data

US 2011/0105031 A1 May 5, 2011

(51) Int. Cl.
*H04B 7/005* (2006.01)
(52) U.S. Cl. ................. 455/41.3; 455/66.1
(58) Field of Classification Search .......... 455/41.2, 455/41.3, 66.1, 550.1, 569.1, 569.2, 575.1, 455/575.2, 575.9, 345, 347, 351, 42
See application file for complete search history.

(56) References Cited

U.S. PATENT DOCUMENTS 7,418,277 B2 * 8/2008 Tsai .................... 455/569.2
2008/0015717 A1 * 1/2008 Griffin et al. ............ 455/41.2

* cited by examiner

*Primary Examiner* — Thanh Le

(57) ABSTRACT

The present invention provides an audio broadcasting system which comprises an audio player, an adaptor and a vehicle stereo device with a FM receiver. The audio player includes a storage unit for storing a plurality of audio files and a processing unit for generating a channel frequency converting signal corresponding to a FM channel frequency of the FM receiver of the vehicle stereo device. The adaptor generates a particular FM signal based on the audio files and the channel frequency converting signal from the audio player and transmits the particular FM signal to the FM receiver of the vehicle stereo device wirelessly for broadcasting.

11 Claims, 6 Drawing Sheets

AUDIO BROADCASTING SYSTEM AND METHOD FOR BROADCASTING THE SAME

BACKGROUND OF THE INVENTION

1. Field of the Invention

The present invention generally relates to an audio broadcasting system, more particularly to an audio broadcasting system and method for broadcasting audio signals in a vehicle.

2. Description of the Prior Art

Recently, the electronic products are developed to be light, thin, short and small. The popular pen driver is one of the examples. Since it has small volume and large memory capacity, it has already replaced the traditional floppy disk. Via combining other functions, the pen driver can also be used to record sounds, receive broadcasting, play MP3 music files and so on.

Car audio systems usually comprise a radio and a CD or cassette player. Plainly an MP3 music file cannot be played through such systems directly, and it has been proposed to provide a connection lead for audio output of the MP3 player. Such leads are not practicable for some car audio systems, but if suitable usually comprise a power lead and an audio signal lead, each connecting to different parts of the car dashboard. These leads are long in order to be suitable for all kinds of vehicle, and can be considered dangerous if they obstruct the vehicle controls. Generally speaking, such connection leads are unreliable and very undesirable.

An adaptor powered by the cigarette lighter in a car can play MP3 or WAV music files stored in the adaptor through the car audio system. That is, the adaptor converts the MP3 or WAV music files to particular FM signals and transmits the FM signals wirelessly to the car radio. The car audio system then broadcasts the received FM signals. In this way, no more undesirable and unreliable leads are needed. After finding out a particular frequency channel without noise or signal interference, users can tune the adaptor to transmit the FM signals corresponding to the particular frequency channel; the FM signals can be broadcasted clearly. The adaptor can be connected to a music (including MP3 or WAV or other audio formats) player for converting MP3 or WAV music files stored in the music player to particular FM signals. Thus, the car audio system can broadcast music files stored in the MP3 player.

However, the adaptor comprises a LCD for displaying FM channels, a plurality buttons for tuning FM channels and a memory for storing music files, therefore, the cost of the adaptor aforementioned is very expensive.

For solving the problem above, some music players are designed with a built-in FM processor for converting MP3 or WAV music files stored in the music player to particular FM signals and transmitting the particular FM signals wirelessly. Therefore, the car broadcasting system plays the particular FM signals transmitted from the music player directly without processing through the adaptor. Although the adaptor is no longer needed, however, the built-in FM processor increases the cost of the music players.

It is desirable, therefore, to provide a low cost adaptor to allow for converting the MP3 or WAV music files to particular FM signals and transmitting the FM signals wirelessly to the car radio.

SUMMARY OF THE INVENTION

The present invention provides an audio broadcasting system which comprises an audio player, an adaptor and a vehicle stereo device with a FM receiver. The audio player includes a storage unit for storing a plurality of audio files and a processing unit for generating a channel frequency converting signal corresponding to a FM channel frequency of the FM receiver of the vehicle stereo device. The adaptor generates a particular FM signal based on the audio files and the channel frequency converting signal from the audio player and transmits the particular FM signal to the FM receiver of the vehicle stereo device wirelessly for broadcasting.

Another embodiment of the present invention provides an audio broadcasting method comprising the steps of: providing an audio player with a storage unit for storing a plurality of audio files; providing a vehicle stereo device with a FM receiver; generating a channel frequency converting signal corresponding to a FM channel frequency of the FM receiver of the vehicle stereo device; providing an adaptor for generating a particular FM signal based on the audio files and the channel frequency converting signal from the audio player; transmitting the particular FM signal to the FM receiver of the vehicle stereo device; and broadcasting the particular FM signal by the vehicle stereo device.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

Figure 1:
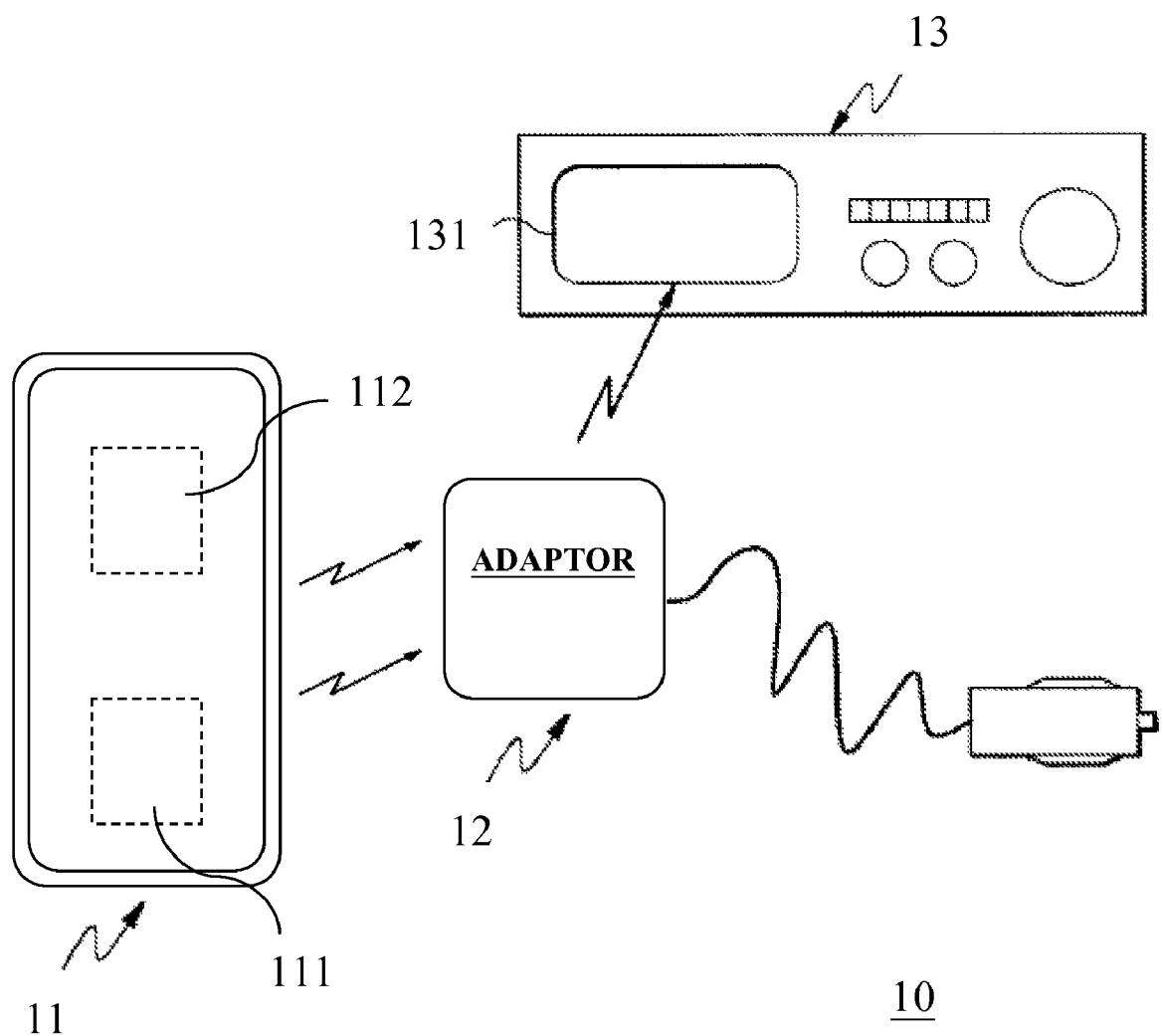
FIG. 1 illustrates a block diagram of the audio broadcasting system of the present invention.

FIG. 1 illustrates a block diagram of the audio broadcasting system of the present invention. The audio broadcasting system 10 comprises an audio player 11, an adaptor 12 and a vehicle stereo device 13 with a FM receiver 131. The audio player 11 includes a storage unit 111 for storing a plurality of audio files and a processing unit 112 for generating a channel frequency converting signal corresponding to a FM channel frequency of the FM receiver 131 of the vehicle stereo device 13. That is, when a user wants to play the audio files stored in the audio player by the vehicle stereo device 13, the user should tune the FM receiver 131 for finding a particular FM channel frequency without any noise or interference at first, for example, FM 108.7, then the user selects the audio files and the channel frequency converting signal (FM 108.7) of the audio player 11. The channel frequency converting signal (FM 108.7) is generated by the processing unit 112 corresponding to a FM channel frequency. If the channel, FM 108.7, is interfered by other audio signals, the user can tune the FM channel frequency (for example, to FM 91.1) of the FM receiver 131 of the vehicle stereo device 13 and the channel frequency converting signal (to FM 91.1) of the audio player 11 for reducing the interference.

The adaptor 12 generates a particular FM signal (FM 108.7) based on the audio files and the channel frequency converting signal from the audio player 11 and transmits the particular FM signal to the FM receiver 131 of the vehicle stereo device 13 for broadcasting wirelessly. That is, the particular FM signal will be broadcasted by the vehicle stereo device 13. FM channel frequency is selected by the user on the audio player 11 and the audio files are stored in the audio player 11. Thus, there is no longer needed to dispose a LCD for displaying FM channels, a plurality buttons for tuning FM channels and a memory for storing audio files. The cost of the adaptor 12 can be reduced. The adaptor 12 can be powered by a cigar lighter or batteries.

For the audio player 11 speaking, the storage unit 111 and the processing unit 112 are existed. The only difference between the audio player 11 of the present invention and aforementioned music player is the software. The audio player 11 adds a program (a vehicle mode) for generating a play list of the audio files and selecting the channel frequency converting signal corresponding to the FM channel frequency of the FM receiver 131 of the vehicle stereo device 13. Without adding any hardware devices, the cost of the audio player won't be increased.

Besides, there exists a cable (not shown) coupled between the audio player 11 and the adaptor 12 for transmitting the audio files and the channel frequency converting signal from the audio player 11 to the adaptor 12. Also, the audio files and the channel frequency converting signal can be transmitted from the audio player 11 to the adaptor 12 wirelessly (for example, Bluetooth, infrared, etc.). Moreover, the adaptor 12 can be directly connect to the audio player 11 receiving the audio files and the channel frequency converting signal and powered by the audio player 11.

The FM receiver 131 of the vehicle stereo device 13 further comprises an empty channel searching unit for finding a FM channel frequency without any interference automatically for saving the searching time of the user.

By the low cost adaptor 12, the cost of the audio broadcasting system 10 of the present invention can be also reduced.

Figure 2:
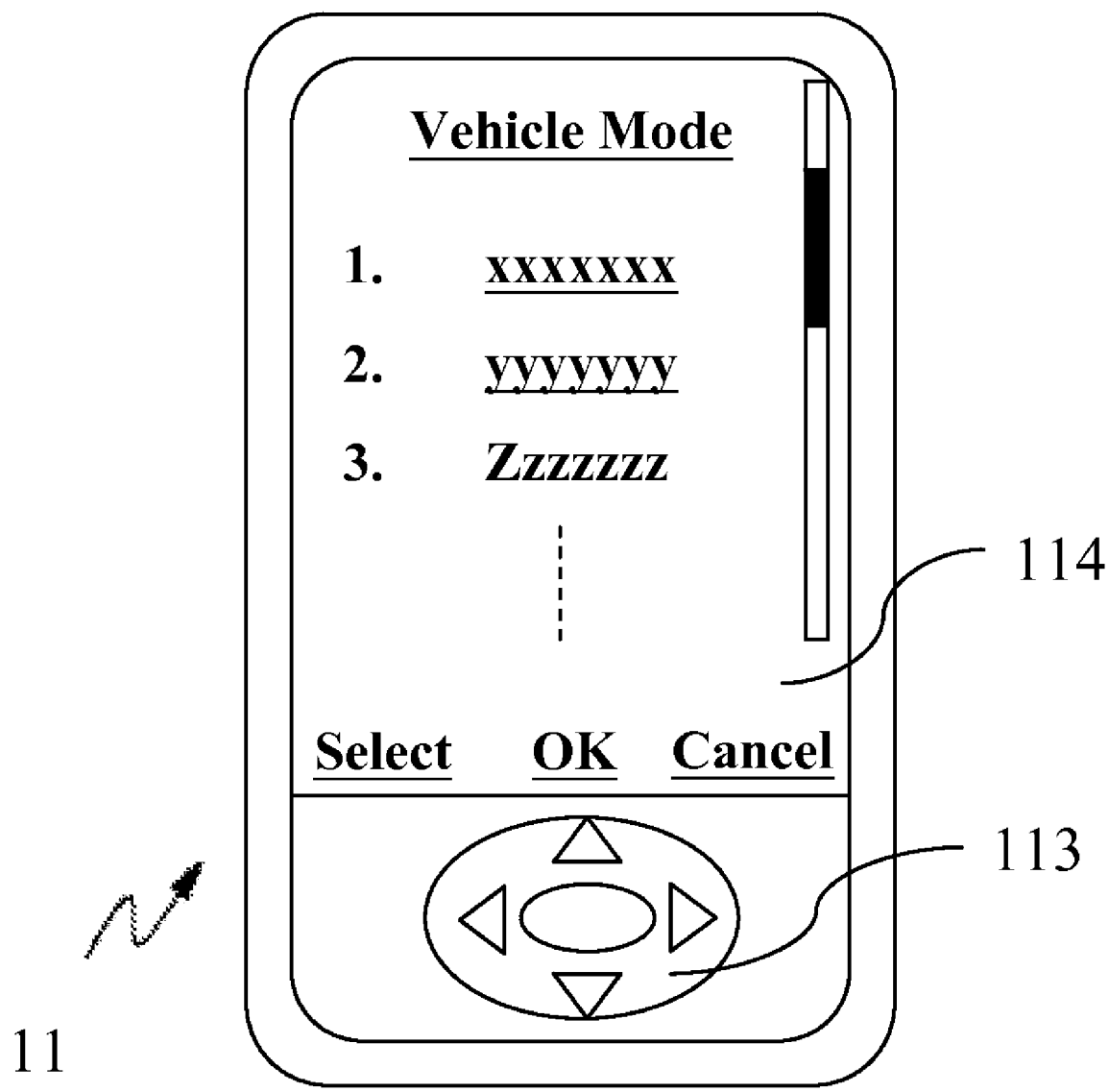
FIG. 2 illustrates an operating diagram of the audio player of the present invention.
Figure 3:
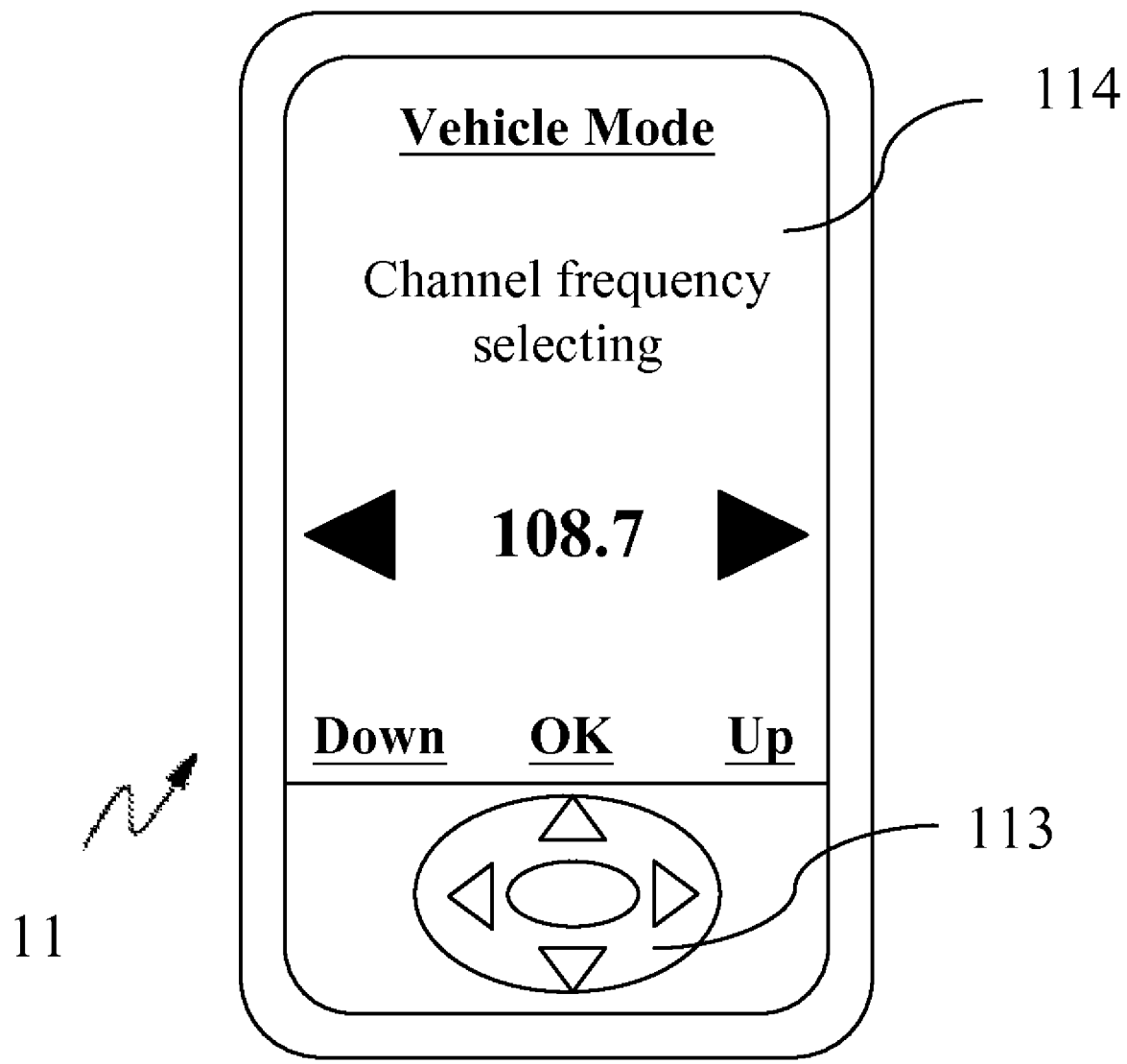
FIG. 3 illustrates another operating diagram of the audio player of the present invention.

FIG. 2 illustrates an operating diagram of the audio player of the present invention and FIG. 3 illustrates another operating diagram of the audio player of the present invention. When the audio player 11 enters a vehicle mode, the user selects the referred audio files on the display screen 114 of the audio player 11 through the control buttons 113 of the audio player 11. After the referred audio files selection finished, the user selects the channel frequency converting signal shown on the display screen 114 of the audio player 11 corresponding to the FM channel frequency of the FM receiver 131 of the vehicle stereo device 13. The channel frequency converting signal can be tuned through the control buttons 113 of the audio player 11. Moreover, if the display screen 114 is a touch screen, the control buttons 113 of the audio player 11 are no longer needed.

Figure 4:
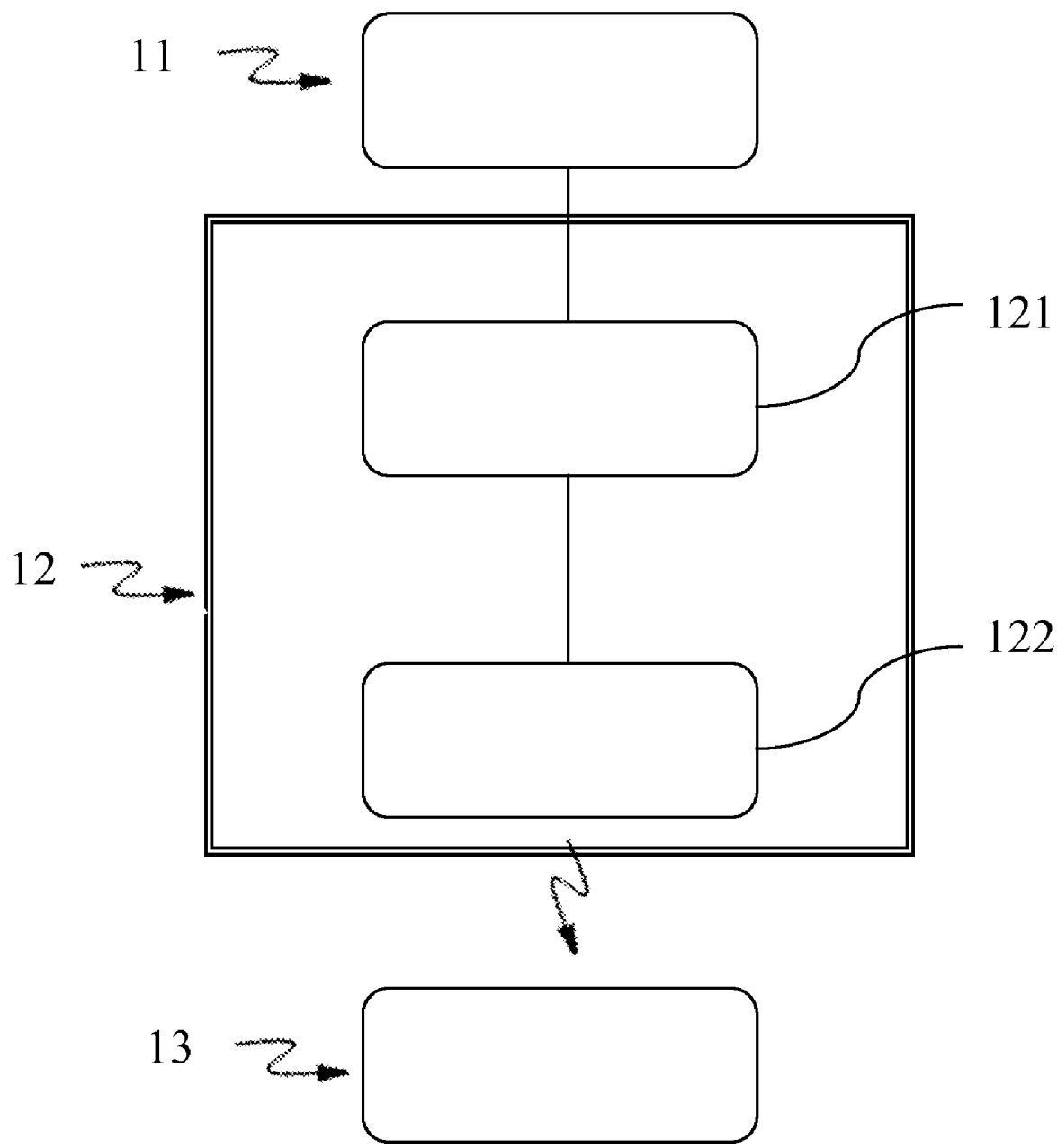
FIG. 4 illustrates a block diagram of the adaptor of the present invention.

FIG. 4 illustrates a block diagram of the adaptor of the present invention. The adaptor 12 comprises a controller unit 121 and a FM transmitter 113. The controller unit 121 is used for receiving the audio files and the channel frequency converting signal from the audio player 11 and generating the particular FM signal. The FM transmitter 113 receives the particular FM signal and transmits the particular FM signal to the vehicle stereo device 13 wirelessly. The controller unit 121 distinguishes the channel frequency converting signal from the audio files for setting the transmitting channel of the FM transmitter 113. The controller unit 121 and the FM transmitter 113 can be separated to two chips or combine in a single chip.

Figure 5:
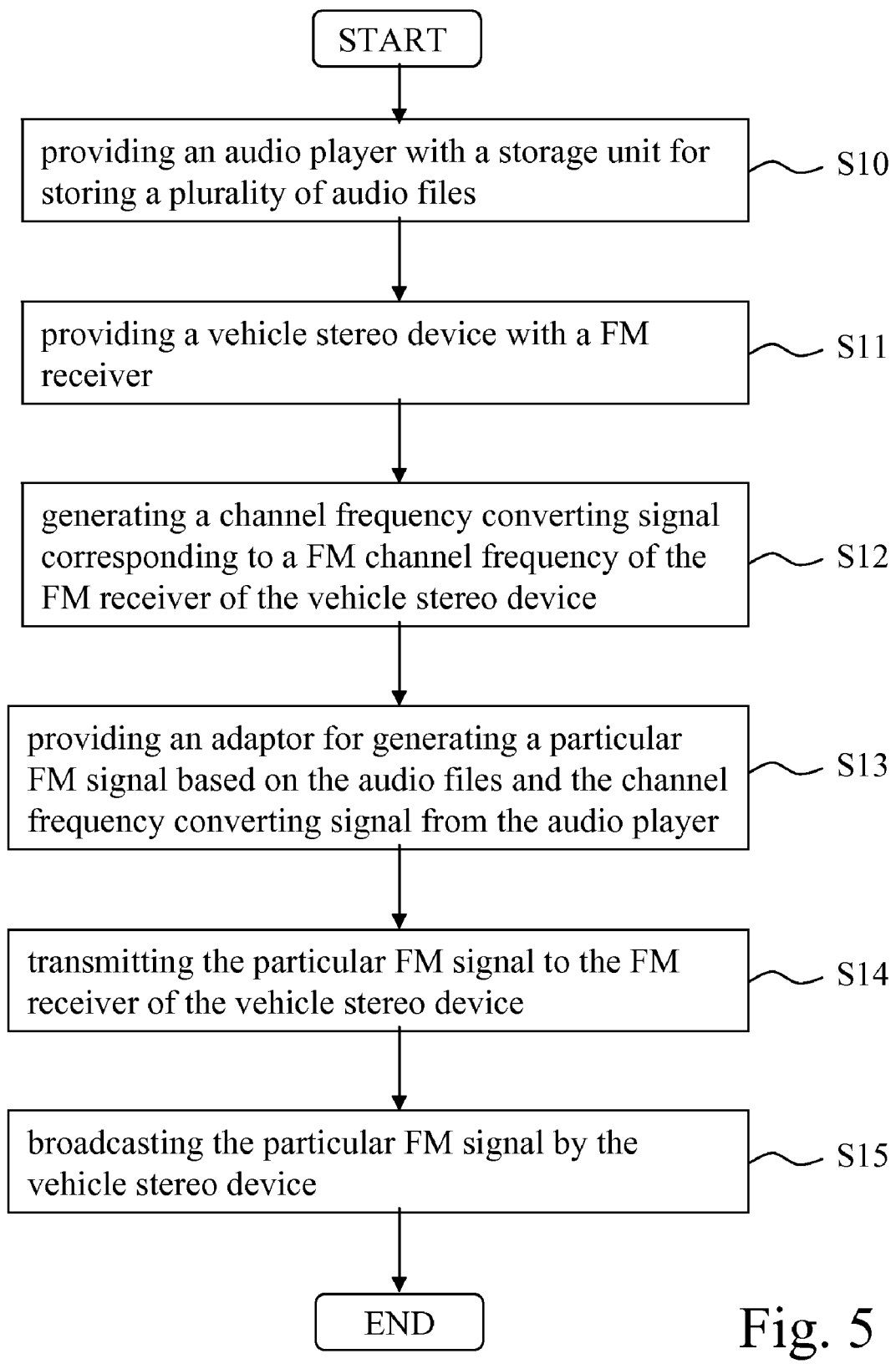
FIG. 5 illustrates a flow chart of the audio broadcasting method of the present invention.

FIG. 5 illustrates a flow chart of the audio broadcasting method of the present invention. The audio broadcasting method comprising the following steps. At first, an audio player with a storage unit for storing a plurality of audio files is provided (step S10), then a vehicle stereo device with a FM receiver is provided (step S11). The audio player generates a channel frequency converting signal corresponding to a FM channel frequency (selected by a user) of the FM receiver of the vehicle stereo device (step S12). Meanwhile, an adaptor for generating a particular FM signal based on the audio files and the channel frequency converting signal from the audio player is provided (step S13). The adaptor transmits the particular FM signal to the FM receiver of the vehicle stereo device (step S14) and the vehicle stereo device broadcasts the particular FM signal (step S15).

In step S13, further comprises the step of providing a cable coupled between the audio player and the adaptor for transmitting the audio files and the channel frequency converting signal from the audio player to the adaptor. Also, the audio files and the channel frequency converting signal can be transmitted from the audio player to the adaptor wirelessly (for example, Bluetooth, infrared, etc.). The audio broadcasting method further comprises the step of finding the FM channel frequency without any interference automatically. The adaptor can be powered by a cigar lighter or batteries.

Figure 6:
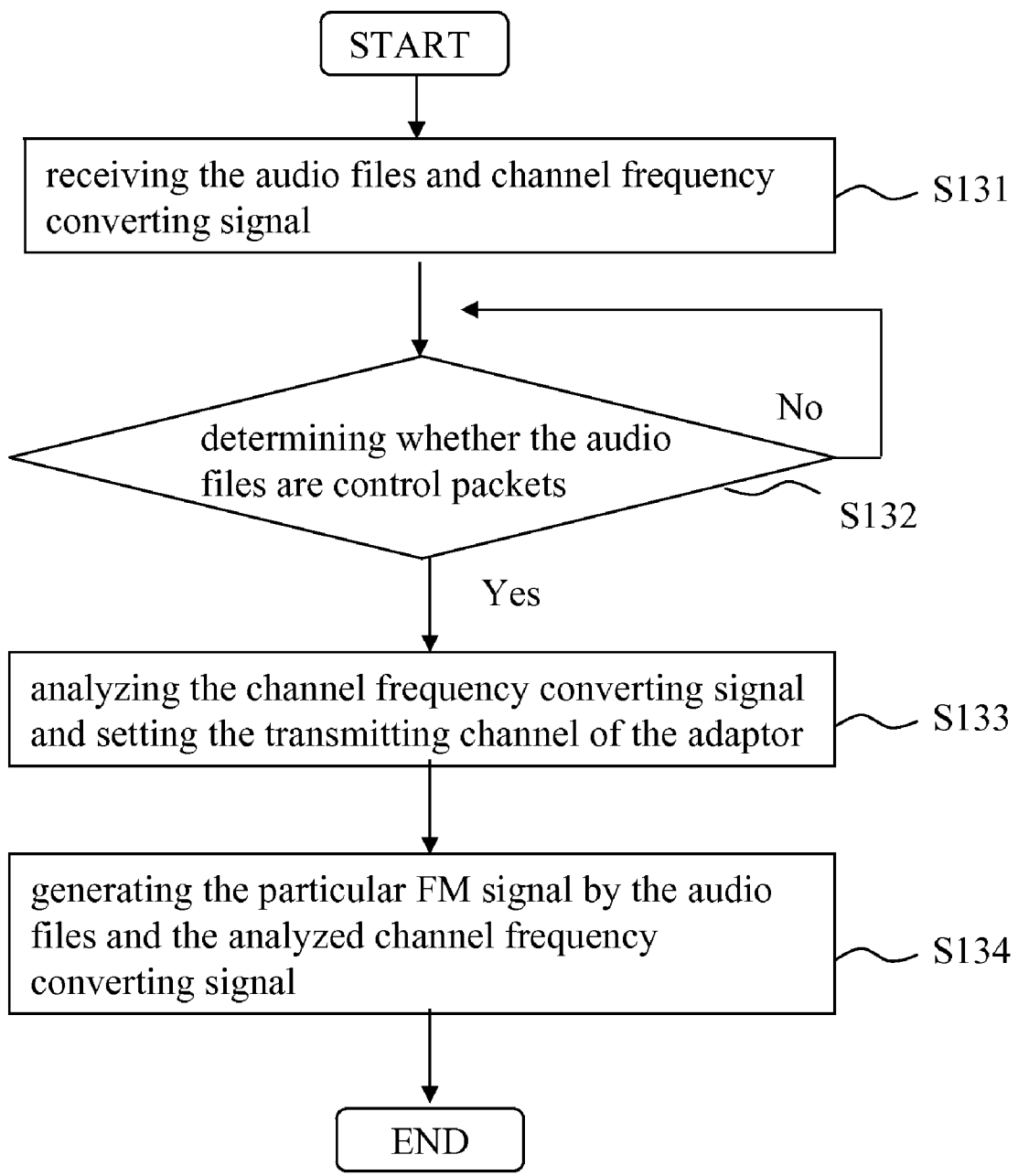
FIG. 6 illustrates another flow chart of the audio broadcasting method of the present invention.

FIG. 6 illustrates another flow chart of the audio broadcasting method of the present invention. The step S13 in FIG. 5 further comprises the steps of receiving the audio files and channel frequency converting signal (step S131) and determining whether the audio files are control packets (step 132). If the audio files are control packets, then goes to step S133. If the audio files are not control packets, it means that the formats of the audio files are unknown for the adaptor and the adaptor can not generate the particular FM signal according to the audio files, then the flow returns to step S131. In step S133, the adaptor analyzes the channel frequency converting signal and setting the transmitting channel of the adaptor. Finally, the adaptor generates the particular FM signal by the audio files and the analyzed channel frequency converting signal (step S134).

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An audio broadcasting system, comprising:
a vehicle stereo device with a FM receiver;
an audio player including:
 a storage unit for storing a plurality of audio files; and
 a processing unit for generating a channel frequency converting signal corresponding to a FM channel frequency of the FM receiver of the vehicle stereo device; and
an adaptor coupling to the audio player and comprising:
 a controller unit for receiving the audio files and the channel frequency converting signal from the audio player, so as to generate a particular FM signal based on the audio files and the channel frequency converting signal; and a FM transmitter for wirelessly transmitting the particular FM signal to the FM receiver of the vehicle stereo device wirelessly for broadcasting.

2. An audio broadcasting system according to claim 1, wherein the adaptor is powered by a cigar lighter or batteries.

3. An audio broadcasting system according to claim 1, further comprises a cable coupled between the audio player and the adaptor for transmitting the audio files and the channel frequency converting signal from the audio player to the adaptor, and the adaptor is directly connected to the audio player and power by the audio player.

4. An audio broadcasting system according to claim 1, wherein the audio files and the channel frequency converting signal is transmitted from the audio player to the adaptor wirelessly.

5. An audio broadcasting system according to claim 4, wherein the FM receiver of the vehicle stereo device further comprises an empty channel searching unit for finding the FM channel frequency without any interference automatically.

6. An audio broadcasting system according to claim 1, wherein the audio files and the channel frequency converting signal is transmitted from the audio player to the adaptor by Bluetooth or infrared.

7. An audio broadcasting method, comprising the steps of:
operating an audio player to set a FM channel frequency, wherein the audio player comprises a storage unit and a processing unit, and the FM channel frequency has no any noise or interference;

operating the audio player to select the audio files stored in the audio player for playing;

the processing unit of the audio player generating a channel frequency converting signal corresponding to the FM channel frequency;

the processing unit transmitting the channel frequency converting signal and the audio files to an adaptor having a controller unit and a FM transmitter;

the adaptor receiving the audio files and the channel frequency converting signal through the controller unit thereof;

the controller unit of the adaptor generate a particular FM signal based on the audio files and the channel frequency converting signal;

the FM transmitter of the adaptor transmitting the particular FM signal out;

operating a FM receiver of a vehicle stereo device to finding the FM channel frequency without any interference automatically; and the FM receiver of the vehicle stereo device receiving and broadcasting the particular FM signal.

8. An audio broadcasting system according to claim 7, wherein the adaptor is powered by a cigar lighter or batteries.

9. An audio broadcasting system according to claim 7, wherein a cable is coupled to the audio player and the adaptor for transmitting the audio files and the channel frequency converting signal, and the adaptor is directly connected to the audio player and powered by the audio player.

10. An audio broadcasting method according to claim 7, wherein the audio files and the channel frequency converting signal is transmitted from the audio player to the adaptor wirelessly.

11. An audio broadcasting method according to claim 10, wherein the audio files and the channel frequency converting signal is transmitted from the audio player to the adaptor by Bluetooth or infrared.

\* \* \* \* \*